UNITED STATES PATENT OFFICE.

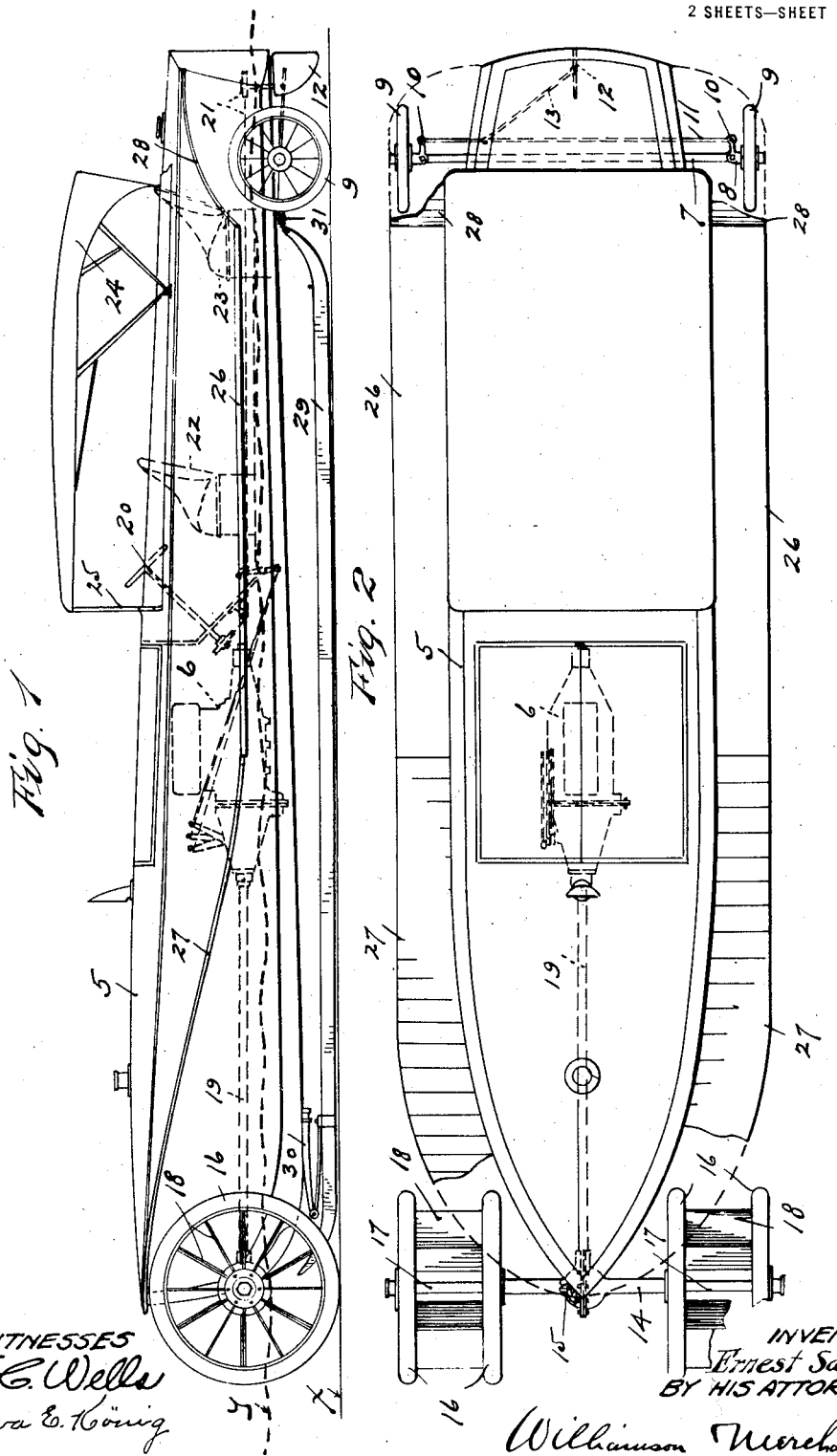

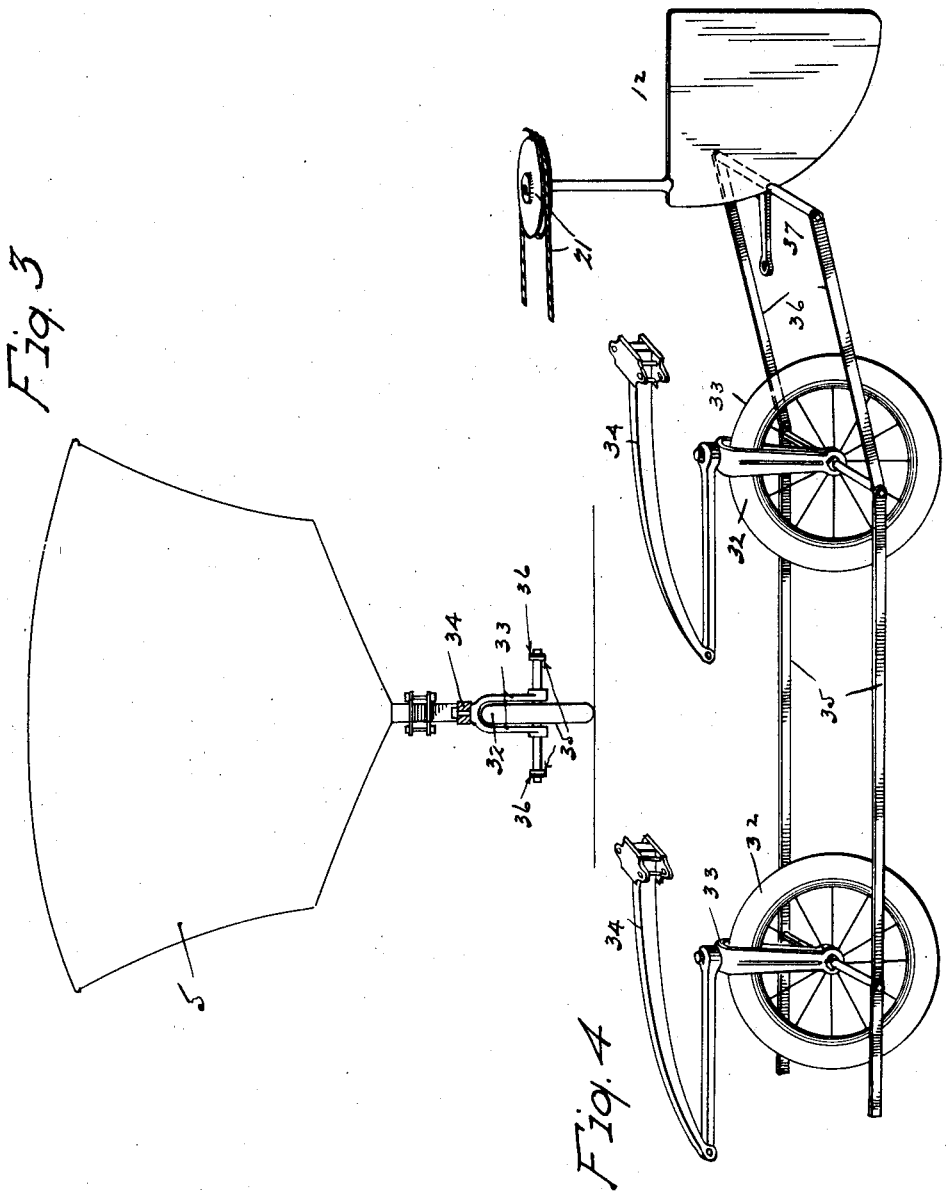

ERNEST SAIRANEN, OF MINNEAPOLIS, MINNESOTA.

COMBINED AUTOMOBILE AND MOTOR-BOAT.

1,344,317.    Specification of Letters Patent.    Patented June 22, 1920.

Application filed July 15, 1918.  Serial No. 244,971.

*To all whom it may concern:*

Be it known that I, ERNEST SAIRANEN, a subject of Finland, residing at Minneapolis, in the county of Hennepin and State of Minnesota, have invented certain new and useful Improvements in Combined Automobiles and Motor-Boats; and I do hereby declare the following to be a full, clear, and exact description of the invention, such as will enable others skilled in the art to which it appertains to make and use the same.

My invention has for its object to provide a combined automobile and motor boat; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a side elevation of the invention;

Fig. 2 is a plan view of the same;

Fig. 3 is a view, partly in diagram and partly in transverse section, illustrating supplemental wheels in place of the runner shown in Fig. 1; and Fig. 4 is a perspective view of the supplemental wheels and rudder removed from the boat hull.

The numeral 5 indicates a vehicle body in the form of a motor boat hull, and the numeral 6 indicates the motive power therefor, which, as shown, is in the form of an internal combustion engine. Secured to the hull 5, is a fixed rear axle 7 having pivoted stub journals 8 on which are mounted pneumatic tire-equipped rear wheels 9. The stub journals 8 have rearwardly projecting arms 10 connected by a bar 11 for simultaneous steering movement.

Mounted on the stern of the hull 5, is a rudder 12, which is connected to the bar 11 by an oblique rod 13. Secured to the prow of the hull 5, is a front axle structure 14 having an ordinary differential mechanism 15. Journaled on each member of the front axle, is a novel combined traction and paddle wheel, each of which comprises a pair of laterally spaced pneumatic tire-equipped wheels 16 mounted on a single hub 17 and connected by circumferentially spaced paddle blades 18. These front wheels 16 are considerably larger than the rear wheels 9 and are driven through the differential mechanism 15 from the engine 6 by a driving shaft 19. The front and rear axles are of the same construction as the axles of an automobile, with the exception that they are in reverse order.

To simultaneously steer the rear wheels 9 and the rudder 12, I mount in the hull 5, just rearward of the engine 6, a wheel-equipped steering post 20 that is connected to the rudder by cables and wheels 21, in the same manner that the steering wheel of a motor boat is connected to the rudder thereof. Just rearward of the steering post 20, is a seat 22 for the operator. Within the hull 5, is also mounted a seat 23 and an ordinary one-manned top 24 is provided for the hull 5, as well as a wind shield 25.

When the vehicle is running on the ground, the same will, of course, travel in the same manner as an automobile, and when running in the water, the same will travel in the same manner as a motor boat and be propelled by the wheels 16. Suitable levers for controlling the engine 6 will, of course, be located within easy reach of the operator. On each side of the hull 5, is a running board 26 and front and rear mud guards 27 and 28 are provided for the wheels 16 and 9, respectively. From the above description, it is evident that the vehicle may run on the land or in the water, without making any changes whatsoever.

To assist in supporting the hull 5 in the winter time, when the vehicle is traveling on ice or snow, I removably secure to the keel of the hull a long runner 29. This runner 29 is attached at its front end to the keel by a spring 30 and its rear end is connected to said keel by a flexible connection 31. To assist in supporting the hull 5, in case the same is of unusual length, I mount thereunder one or more supplemental wheels 32. As shown in the drawings, there are two of these wheels in tandem and each thereof is journaled in a caster bracket 33 attached to the keel of the hull by a spring 34. The journals of these wheels 32 are extended outward at the brackets 33 and connected by parallel bars 35 for simultaneous angular steering movement. The rearmost wheel 32 is connected to the rudder 12 by a pair of rods 36 for simultaneous steering movement therewith. The front ends of the rods 36 are connected to the outer ends of the journals and the rear wheels 32 and their rear ends are connected to the outer ends of a pair of oppositely projecting rods 37 on the rudder 12.

The ground line is indicated by the letter X and the water line by the letter Y. (See Fig. 1.)

What I claim is:—

1. The combination with a boat hull, of wheels supporting said hull, certain of said wheels being provided with paddle blades and acting as traction wheels, and a runner and a supplemental wheel interchangeably secured to the keel of the boat hull.

2. The combination with a boat hull, of wheels supporting said hull, certain of said wheels being provided with paddle blades and acting as traction wheels, a rudder for the hull, a supplemental wheel supporting the hull, and a connection from the rudder to the supplemental wheel for steering the same.

3. The combination with a boat hull, of wheels supporting said hull, certain of said wheels being provided with paddle blades and acting as traction wheels, a rudder for the hull, tandem supplemental wheels supporting the hull, said supplemental wheels being connected for simultaneous angular steering movement, and a connection from the rudder to the supplemental wheels for steering movement.

In testimony whereof I affix my signature in presence of two witnesses.

ERNEST SAIRANEN.

Witnesses:
CLARA DEMAREST,
HARRY D. KILGORE.